United States Patent [19]

Poehlein

[11] Patent Number: 5,410,389
[45] Date of Patent: Apr. 25, 1995

[54] NEUTRAL SIDE FORCE BELT SUPPORT SYSTEM

[75] Inventor: Raymond E. Poehlein, Fairport, N.Y.

[73] Assignee: Xerox Corporation, Stamford, Conn.

[21] Appl. No.: 113,114

[22] Filed: Aug. 30, 1993

[51] Int. Cl.⁶ .............................................. G03G 21/00
[52] U.S. Cl. .................................. 355/212; 198/825; 198/840; 474/123
[58] Field of Search ................ 355/212; 198/824, 825, 198/840; 474/122, 123, 124

[56] References Cited

U.S. PATENT DOCUMENTS

| | | |
|---|---|---|
| 3,518,739 | 7/1970 | Butler . |
| 3,694,068 | 9/1972 | Jordan .......................... 198/184 X |
| 3,726,588 | 4/1973 | Moser . |
| 3,974,952 | 8/1976 | Swanke et al. ................. 226/189 |
| 4,027,966 | 6/1977 | Jordan ............................ 198/806 |
| 4,170,175 | 10/1979 | Conlon ............................ 101/1 |
| 4,174,171 | 11/1979 | Hamaker et al. .................. 355/3 |
| 4,178,094 | 12/1979 | Silverberg ......................... 355/16 |
| 4,189,223 | 2/1980 | Silverberg ..................... 198/811 X |
| 4,197,002 | 4/1980 | Hamaker et al. .............. 198/811 X |
| 4,221,480 | 9/1980 | Spehrley ............................. 355/3 |
| 4,344,693 | 8/1982 | Hamaker ............................ 355/3 |
| 4,358,267 | 11/1982 | Brun ............................. 198/840 X |
| 4,367,031 | 1/1983 | Hamaker ........................ 198/840 X |
| 4,397,538 | 8/1983 | Castelli et al. . |
| 4,421,228 | 12/1983 | Marsiglio et al. ............... 198/840 X |
| 4,429,985 | 2/1984 | Yokota . |
| 4,462,676 | 7/1984 | Shimura et al. ............... 198/806 X |
| 4,483,607 | 11/1984 | Nagayama . |
| 4,527,686 | 7/1985 | Satoh ............................... 198/807 |
| 4,561,757 | 12/1985 | Salamon et al. ..................... 355/3 |
| 4,596,457 | 6/1986 | Peeters et al. . |
| 4,627,702 | 12/1986 | Anderson ..................... 198/835 X |
| 4,657,370 | 4/1987 | Forbes et al. ....................... 355/3 |
| 4,790,428 | 12/1988 | Ramsey ........................... 198/840 |
| 4,917,232 | 4/1990 | Densmore ..................... 198/840 X |
| 5,017,969 | 5/1991 | Mitomi et al. ................ 198/840 X |
| 5,070,365 | 12/1991 | Agarwal ............................ 355/212 |
| 5,225,877 | 7/1993 | Wong ................................ 355/212 |

FOREIGN PATENT DOCUMENTS

| | | | |
|---|---|---|---|
| 519945 | 12/1992 | European Pat. Off. ......... 355/212 |
| 57-199708 | 12/1982 | Japan ................................. 198/840 |
| 57-200050 | 12/1982 | Japan ................................. 355/212 |

Primary Examiner—R. L. Moses
Attorney, Agent, or Firm—Kevin R. Kepner

[57] ABSTRACT

A system to support a moving photoreceptor belt in an electrophotographic printing machine while minimizing lateral forces applied thereon. Pairs of idler rolls are located in contact with the inner surface of the belt in an arrangement in which the axes of rotation of the idlers are skewed in substantially equal but opposite angles from a direction perpendicular to the direction of belt motion. As the resultant lateral forces between the belt and rolls act in a direction nearly parallel to the axes of rotation of the idlers, the opposing skew essentially cancels the side force of each pair of idlers which promotes good belt tracking. As the idlers are freely rotating, drag and tensioning forces on the belt are also minimized.

5 Claims, 3 Drawing Sheets

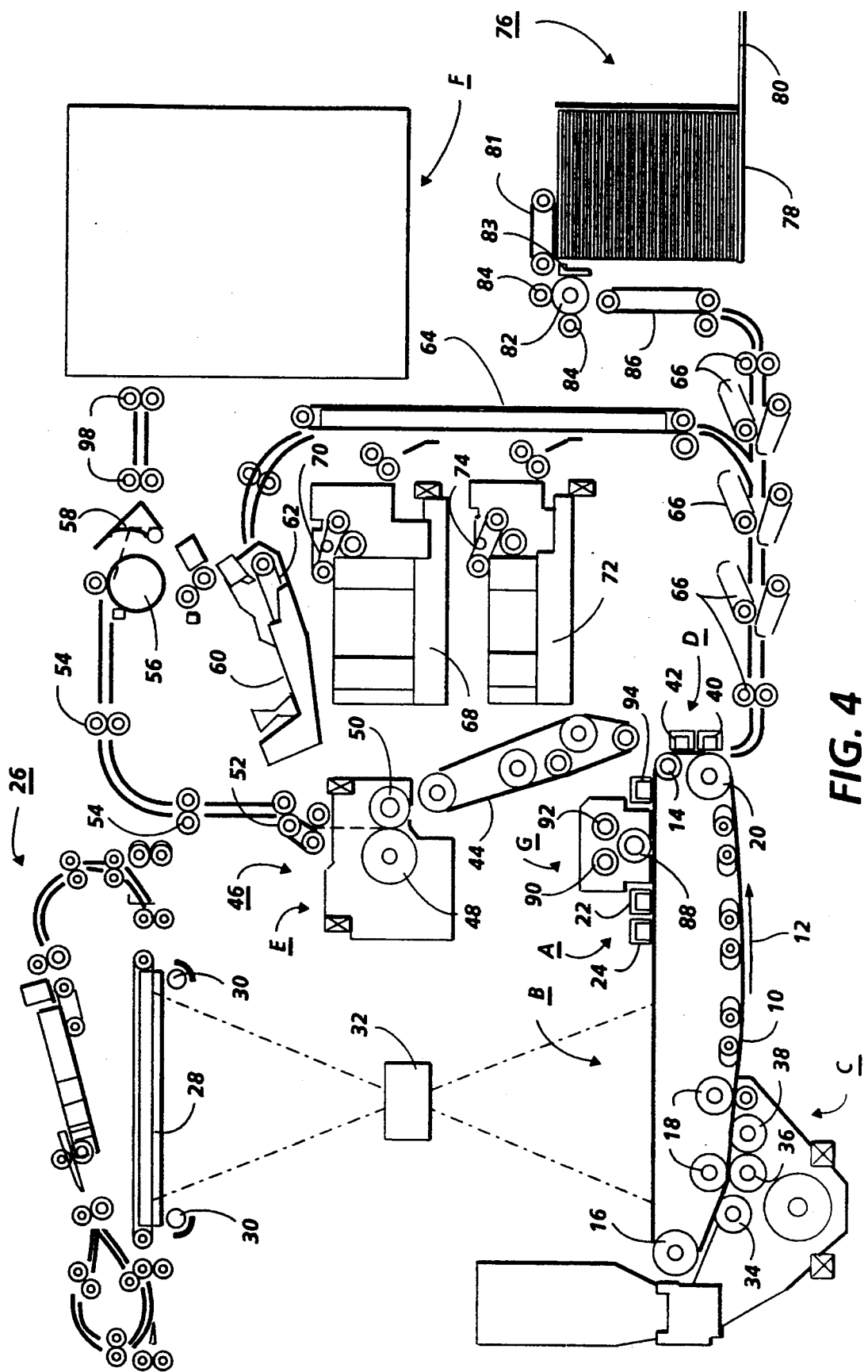

NEUTRAL SIDE FORCE BELT SUPPORT SYSTEM

This invention relates generally to a endless web support device, and more particularly concerns a system to support a photoreceptor belt moving in a recirculating path while inducing minimal side forces on the belt.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

Many commercial applications of the above process employ a photoconductive member in the form of a belt which is supported about a predetermined path past a plurality of processing stations to ultimately form a reproduced image on copy paper. The location of the latent image recorded on the photoconductive belt must be precisely defined in order to have the various processing stations acting thereon optimize copy quality. To this end, it is critical that the lateral alignment of the photoconductive belt be controlled within prescribed tolerances. Only in this manner will a photoconductive belt move through a predetermined path so that the processing stations disposed thereabout will be located precisely relative to the latent image recorded thereon. Lateral movement of the photoconductive belt is particularly a problem in connection with color copiers where the precise tracking of the belt is mandatory for acceptable copy quality.

When considering control of the lateral movement of the belt, it is well known that if the belt were perfectly constructed and entrained about perfectly cylindrical rollers mounted and secured in an exactly parallel relationship with one another, there would be no lateral movement of the belt. In actual practice, however, this is not feasible. Due to the imperfections in the system's geometry, the belt velocity vector is not normal to the roller axis of the rotation, and the belt will move laterally relative to a roller until reaching a kinematically stable position.

Existing methods of controlling the lateral movement of a belt comprise servo systems, crowned rollers and flanged rollers. Servo systems use steering rollers to maintain lateral control of the belt. While they generally apply less stress to the sides of the belt than flanged rollers, servo systems are frequently rather complex, costly and require a large space within the machine. Flanged rollers while being inexpensive, frequently produce high local stresses resulting in damage to the edges of the belt.

The following disclosures may be relevant to various aspects of the present invention:

U.S. Pat. No. 4,657,370

Inventor: Forbes II, et al.

Issue Date: Apr. 14, 1987

U.S. Pat. No. 4,561,757

Inventor: Salomon et al.

Issue Date: Dec. 31, 1985

U.S. Pat. No. 4,344,693

Inventor: Hamaker

Issue Date: Aug. 17, 1982

U.S. Pat. No. 4,221,480

Inventor: Spehrley, Jr.

Issue Date: Sept. 9, 1980

U.S. Pat. No. 4,178,094

Inventor: Silverberg

Issue Date: Dec. 11, 1979

U.S. Pat. No. 4,174,171

Inventor: Hamaker et ano.

Issue Date: Nov. 13, 1979

U.S. Pat. No. 4,170,175

Inventor: ConIon, Jr

Issue Date: Oct. 9, 1979

The relevant portions of the foregoing disclosures may be briefly summarized as follows:

U.S. Pat. No. 4,657,370 to Forbes II discloses a belt support and tracking apparatus which consists of a stationary non-rotating arcuate tracking shoe with a belt defining surface for supporting a belt thereon and includes vertically oriented flanges at each side of the path defining surface extending from the path defining surface out relay to provide belt edge guides.

U.S. Pat. No. 4,561,757 to Salomon et al discloses an apparatus in which lateral movement of a moving belt is controlled so that the belt moves in a predetermined path. The apparatus includes at least one rotatably mounted roller having an elastic membrane and train thereabout. The coefficient of friction between the membrane and the roller is low so as to form a low friction interface therebetween. A pair of opposed space flanges constrain the belt and as the belt moves in a lateral direction one of the flanges engages the side edge of the belt to prevent lateral movement thereof. When the side edge of the belt engages the flange, the elastic membrane slips on the roller when the force applied on the side edge of the belt is greater than the maximum frictional force between the roller and the elastic membrane in the direction of lateral movement of the belt.

U.S. Pat. No. 4,344,693 to Hamaker discloses an apparatus which controls the lateral alignment of a belt arranged to move in a predetermined path. Pivotally mounted belt support is frictionally driven to move in unison with the belt. Lateral movement of the belt applies a frictional force on the belt support which tilts the belt support in a direction so as to restore the belt to the predetermined path of movement.

U.S. Pat. No. 4,221,480 to Spehrley, Jr. discloses a belt support and control system in which lateral movement of a moving belt is controlled so the belt moves in a predetermined path. The apparatus includes at least one moving member having a plurality of space flexible disks extending outwardly from the exterior surface thereof. The portion or segment of the disk contacting the region of the belt passing thereover provides support for the belt preventing the belt from deviating laterally from the predetermined path deflects the portion or segments of the disks providing support for the belt, and the deflected portion of the disk returns to the undeflected condition when not supporting the belt.

U.S. Pat. No. 4,178,094 to Silverberg discloses an apparatus which prevents lateral movement of a belt moving in a predetermined path. The apparatus includes a readily deformable surface which moves the belt in the predetermined path and a support for preventing lateral movement of the belt. Strains induced in the belt by preventing lateral movement thereof distort the deformable surface which in turn caused the belt to return to the predetermined path.

U.S. Pat. No. 4,174,171 to Hamaker et ano. disclose an apparatus for controlling the lateral alignment of a moving photoconductive belt. A resilient support constrains lateral movement of the belt causing a moment to be applied to a pivotably mounted steering post. As a result, the steering post pivots in a direction to restore the belt along a predetermined path. This apparatus is passive and provides no active electronic feedback.

U.S. Pat. No. 4,170,175 to ConIon, Jr. discloses a system for tracking an endless belt which automatically compensates for creep of the belt. The belt is supported by four rollers. A first is a drive roller, a second and third are idler rollers, and a fourth roller is an idler roller with flared ends. The flared roller provides passive tracking without electronic or active feedback. One of the idler rollers is spring loaded such that when an edge of the belt creeps up on one of the flared ends of the fourth roller, that side of the spring loaded roller is caused to tilt due to increased belt stiffness on that side. This positions the belt laterally toward a central position.

In accordance with one aspect of the present invention, there is provided an apparatus for supporting a web moving along a path in a predetermined direction. The apparatus includes a first rotatable member contacting the web and a second rotatable member contacting the web, said first rotatable member and said second rotatable member being oriented relative to one another to cancel forces applied on the web in a direction substantially normal to the predetermined direction.

Pursuant to another aspect of the present invention, there is provided an electrophotographic printing machine of the type having an endless photoreceptor belt arranged to move along a path in a predetermined direction. The printing machine includes a first rotatable member contacting the belt and a second rotatable member contacting the belt, said first rotatable member and said second rotatable member being oriented relative to one another to cancel forces applied on the belt in a direction substantially normal to the predetermined direction.

Other features of the present invention will become apparent as the following description proceeds and upon reference to the drawings, in which:

FIG. 4 is a schematic elevational view of an electrophotographic printing machine incorporating the FIG. 1 belt therein.

Figure 1:
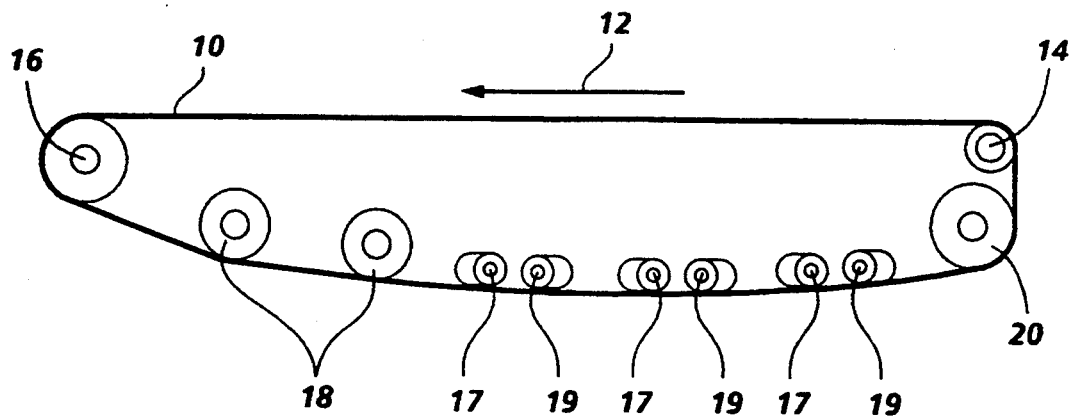
FIG. 1 is an elevational view of a belt illustrating the drive and supporting rollers including the device of the present invention.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

For a general understanding of the features of the present invention, reference is made to the drawings. In the drawings, like reference numerals have been used throughout to identify identical elements. FIG. 4 schematically depicts an electrophotographic printing machine incorporating the features of the present invention therein. It will become evident from the following discussion that the belt tracking device of the present invention may be employed in a wide variety of machines and is not specifically limited in its application to the particular embodiment depicted herein.

Referring to FIG. 4 of the drawings, the electrophotographic printing machine employs a photoconductive belt 10. Preferably, the photoconductive belt 10 is made from a photoconductive material coated on a ground layer, which, in turn, is coated on an anti-curl backing layer. The photoconductive material is made from a transport layer coated on a selenium generator layer. The transport layer transports positive charges from the generator layer. The generator layer is coated on an interface layer. The interface layer is coated on the ground layer made from a titanium coated Mylar ™. The interface layer aids in the transfer of electrons to the ground layer. The ground layer is very thin and allows light to pass therethrough. Other suitable photoconductive materials, ground layers, and anti-curl backing layers may also be employed. Belt 10 moves in the direction of arrow 12 to advance successive portions sequentially through the various processing stations disposed about the path of movement thereof. Belt 10 is entrained about stripping roller 14, tensioning roller 16, idler rolls 18 and drive roller 20. Stripping roller 14 and idler roller 18 are mounted rotatably so as to rotate with belt 10. Tensioning roller 16 is resiliently urged against belt 10 to maintain belt 10 under the desired tension. Drive roller 20 is rotated by a motor coupled thereto by suitable means such as a belt drive. As roller 20 rotates, it advances belt 10 in the direction of arrow 12.

Initially, a portion of the photoconductive surface passes through charging station A. At charging station A, two corona generating devices indicated generally by the reference numerals 22 and 24 charge the photoconductive belt 10 to a relatively high, substantially uniform potential. Corona generating device 22 places all of the required charge on photoconductive belt 10. Corona generating device 24 acts as a leveling device, and fills in any areas missed by corona generating device 22.

Next, the charged portion of the photoconductive surface is advanced through imaging station B. At imaging station B, a document handling unit indicated generally by the reference numeral 26 is positioned over platen 28 of the printing machine. Document handling unit 26 sequentially feeds documents from a stack of documents placed by the operator faceup in a normal forward collated order in the document stacking and holding tray. A document feeder located below the tray, forwards the bottom document in the stack to a pair of take-away rollers. The bottom sheet is then fed by the rollers through a document guide to a feed roll pair and belt. The belt advances the document to platen 28. After imaging, the original document is fed from platen 28 by the belt into a guide and feed roll pair. The document then advances into an inverter mechanism and back to the document stack through the feed roll pair. A position gate is provided to divert the document to the inverter or to the feed roll pair. Imaging of the document is achieved by lamps 30 which illuminate the document on a platen 28. Light rays reflected from the document are transmitted through the lens 32. Lens 32 focuses light images of the document onto the charged portion of the photoconductive belt 10 to selectively dissipate the charge thereon. This records an electrostatic latent image on the photoconductive belt which corresponds to the informational areas contained within the original document. Thereafter, belt 10 advances the electrostatic latent image recorded thereon to development station C.

Obviously, electronic imaging of page image information could be facilitated by a printing apparatus utilizing electrical imaging signals. The printing apparatus can be a digital copier including an input device such as a raster input scanner (RIS) and a printer output device such as a raster output scanner (ROS), or, a printer utilizing a printer output device such as a ROS. Other types of imaging systems may also be used employing, for example, a pivoting or shiftable LED write bar or projection LCD (liquid crystal display) or other electro-optic display as the "write" source.

Thereafter, belt 10 advances the electrostatic latent image recorded thereon to development station C. Development station C has three magnetic brush developer rolls indicated generally by the reference numerals 34, 36 and 38. A paddle wheel picks up developer material and delivers it to the developer rolls. When the developer material reaches rolls 34 and 36, it is magnetically split between the rolls with half of the developer material being delivered to each roll. Photoconductive belt 10 is partially wrapped about rolls 34 and 36 to form extended development zones. Developer roll 38 is a clean-up roll. A magnetic roll, positioned after developer roll 38, in the direction of arrow 12 is a carrier granule removal device adapted to remove any carrier granules adhering to belt 10. Thus, rolls 34 and 36 advance developer material into contact with the electrostatic latent image. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pretransfer light from a lamp (not shown) to reduce the attraction between photoconductive belt 10 and the toner powder image. Next, a corona generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent, which prevents toner from adhering to the fuser roller 48, transfers to a donor roll (not shown) and then to the fuser roll 48.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station F, or to duplex tray 60. At finishing station F, copy sheets are stacked in a compiler tray and attached to one another to form sets. The sheets can be attached to one another by either a binder or a stapler. In either case, a plurality of sets of documents are formed in finishing station F. Duplex tray 60 provides an intermediate or buffer storage for those sheets that have been printed on one side and on which an image will be subsequently printed on the second, opposite side thereof, i.e., the sheets being duplexed. The sheets are stacked in duplex tray 60 facedown on top of one another in the order in which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

Copy sheets are fed to transfer station D from the secondary tray 68. The secondary tray 68 includes an elevator driven by a bidirectional AC motor. Its controller has the ability to drive the tray up or down. When the tray is in the down position, stacks of copy sheets are loaded thereon or unloaded therefrom. In the up position, successive copy sheets may be fed therefrom by sheet feeder 70. Sheet feeder 70 is a friction retard feeder utilizing a feed belt and take-away rolls to advance successive copy sheets to transport 64 which advances the sheets to rolls 66 and then to transfer station D.

Copy sheets may also be fed to transfer station D from the auxiliary tray 72. The auxiliary tray 72 includes an elevator driven by a directional AC motor. Its controller has the ability to drive the tray up or down. When the tray is in the down position, stacks of copy sheets are loaded thereon or unloaded therefrom. In the up position, successive copy sheets may be fed therefrom by sheet feeder 74. Sheet feeder 74 is a friction retard feeder utilizing a feed belt and take-away rolls to advance successive copy sheets to transport 64 which advances the sheets to rolls 66 and then to transfer station D.

Secondary tray 68 and auxiliary tray 72 are secondary sources of copy sheets. The high capacity sheet feeder, indicated generally by the reference numeral 76, is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 66 which, in turn, move the sheet to transfer station D.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls. The reclaim roll is electrically biased negatively relative to the cleaner roll so as to remove toner particles therefrom. The waste roll is electrically biased positively relative to the reclaim roll so as to remove paper debris and wrong sign toner particles. The toner particles on the reclaim roll are scraped off and deposited in a reclaim auger (not shown), where it is transported out of the rear of cleaning station G.

The various machine functions are regulated by a controller. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc.. The control of all of the exemplary systems heretofore described may be accomplished by conventional control switch inputs from the printing machine consoles selected by the operator. Conventional sheet path sensors or switches may be utilized to keep track of the position of the document and the copy sheets. In addition, the controller regulates the various positions of the gates depending upon the mode of operation selected.

Turning now to FIG. 1, an isolated view of the photoreceptor belt 10 and the tracking rollers 17, 19 of the present invention is illustrated. There is shown a drive roll 20, a stripper roll 14, a steering/tensioning roll 16, and a number of idler rolls 17, 19 to support the backside of the belt 10. Analysis has indicated that using idler rolls results in resultant tangential forces between the rolls and the belt that act in a direction that is nearly parallel to the axis of rotation of the idler rolls. These forces can have detrimental effects on belt tracking. In some systems, idler rolls have been replaced with skid plates so that the line of action of the tangential forces align with the direction of belt travel. This greatly reduces tracking forces but can lead to undesirably high drag and tensioning forces on the belt.

Figure 3A:
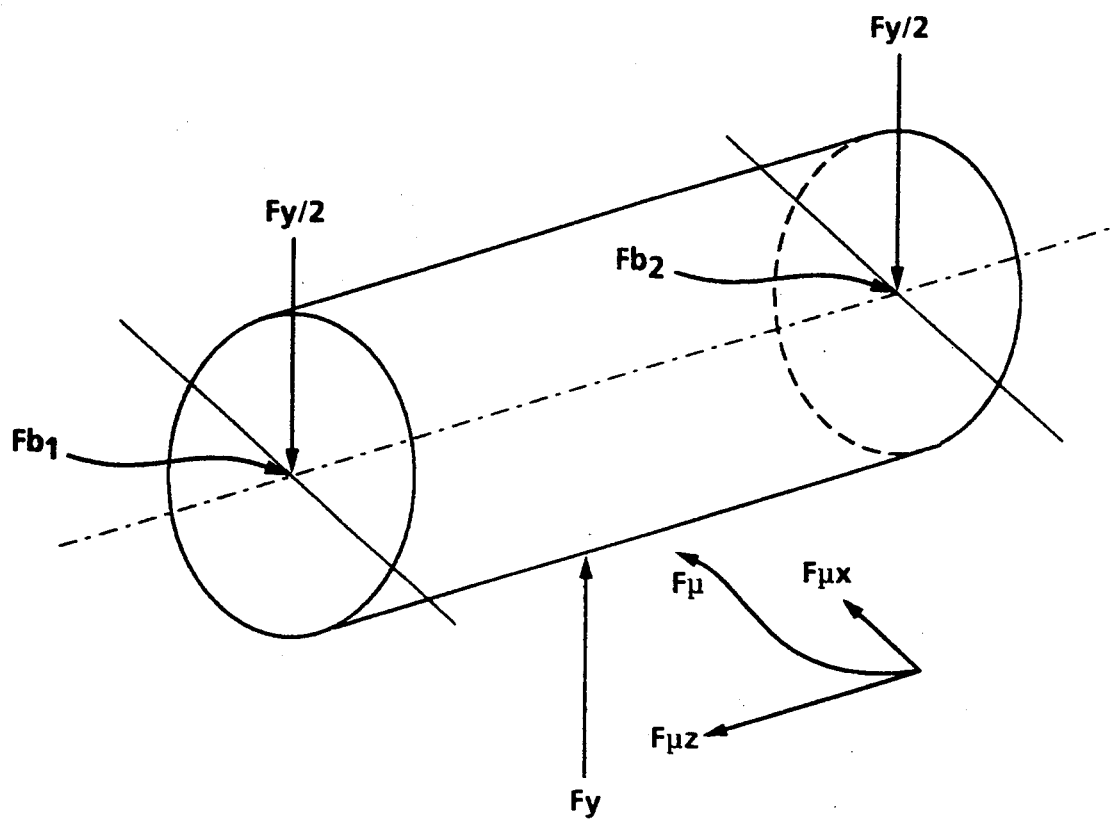
FIGS. 3A and 3B are free body and force diagrams illustrating the effect of the FIG. 1 belt support system.
Figure 3B:
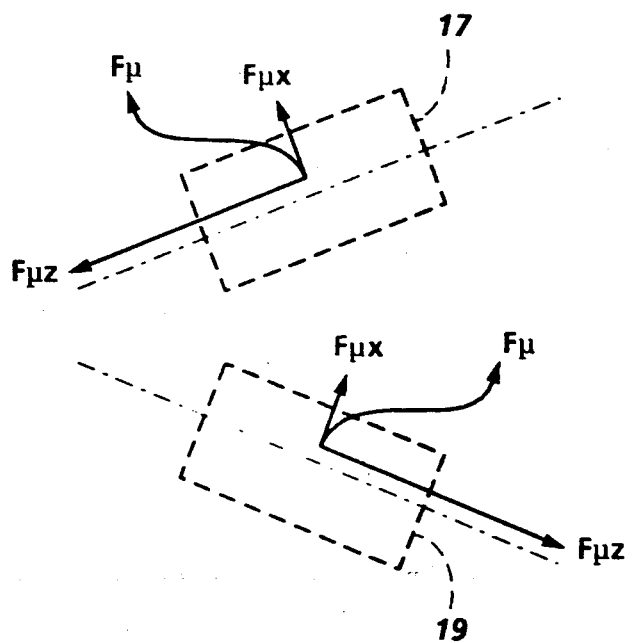

FIGS. 3A and 3B are illustrations of a single idler roll free body diagram and a force diagram for a pair of oppositely skewed idler rolls. Turning first to the free body diagram (FIG. 3A) of the idler roll;

$F_y$ is the engagement force between the roll and the belt, $F_{y/2}$ equals the radial forces on the idler roll bearings, $F_\mu$ is the tangential force between the roll and the belt, and $F_{b1}$ and $F_{b2}$ are the non-radial forces on the roll bearings.

It should be noted that all of the forces transmitted form the belt to the idler roll must be countered (opposed) by forces through the idler roll bearings. If we separate $F_\mu$ into its "X" and "Z" components, as illustrated in FIG. 3A, we see that the bearings must supply a radial force to counter the engagement force $F_y$, a thrust force to counter $F_{\mu z}$ and a circumferential force to counter $F_{\mu x}$. If the idler roll has good bearings (i.e. bearings that offer little resistance to rotation) they cannot counter a large circumferential force ($F_{\mu x}$). If $F_{\mu x}$ is larger than the bearing can resist, the idler roll will accelerate indefinitely. Since this cannot happen in this type of a system, it is implied that the direction of force $F_\mu$ is almost parallel to the axis of the idler roll, therefore, $F_\mu$ is essentially a thrust force.

Looking now at the FIG. 3B, it can be seen that the $F_\mu$ which is essentially the arrow $F_{\mu z}$ for each roll is essentially parallel to the axis of rotation of the idler rolls 17, 19. When the idler rolls 17, 19 are oppositely skewed as illustrated in FIG. 3B, the tangential force of roll 17 will be essentially equal and opposite the tangential force transmitted by roll 19. Accordingly, the effect of this pair of idler rolls is to substantially neutralize the lateral forces transmitted to the belt as the belt is moved past and supported by the rolls.

Figure 2:
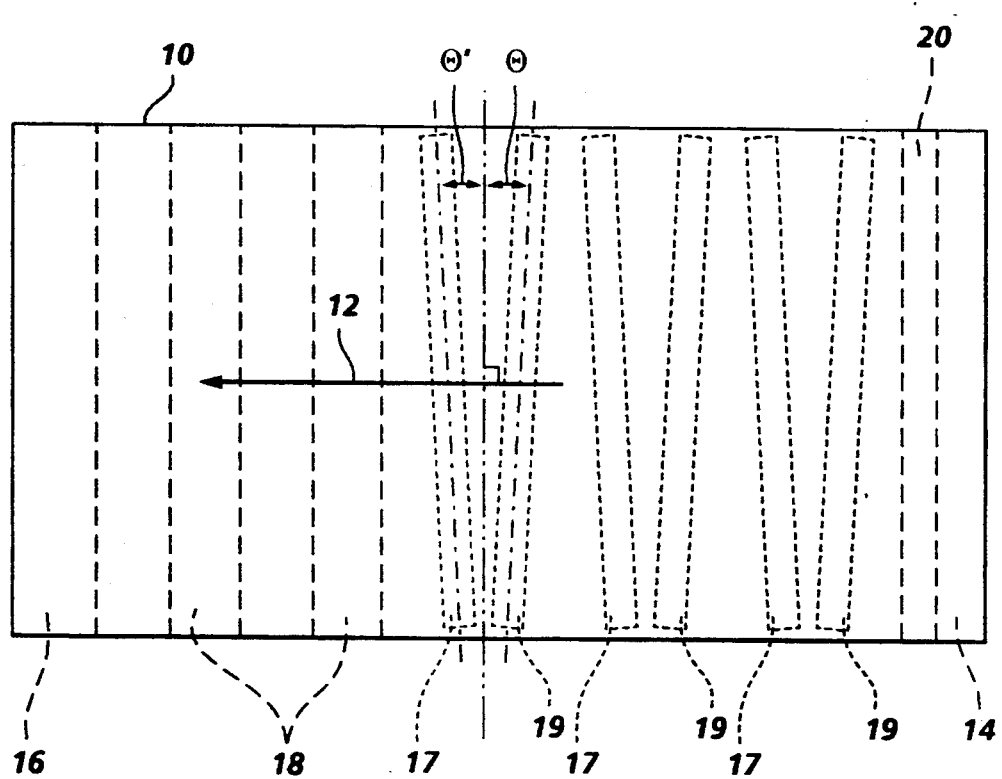
FIG. 2 is a partial plan view of the FIG. 1 belt illustrating the configuration of the idler rollers.

The FIG. 1 system intentionally skews the alternate idler rolls 17, 19 in opposite directions so as to cancel out the side forces (which are substantially parallel to the rotation axis of the rolls) on the belt 10. Each pair of idler rolls has the rolls skewed in opposite directions as is illustrated in FIG. 2. Ideally, as a result of the opposite skewing, each pair of idler rolls would neutralize the individual tangential forces applied to the belt by each roll and the net tangential force exerted by the idler roll pair would be minimized. While ideally the skew angles $\Theta$ and $\Theta'$ as illustrated, should be equal and opposite for each roll pair, in actuality this will not likely be the case and is not critical. This is partially due to the fact that as the belt tracks and is steered laterally, the angle between the axis of rotation of the idler roll and axis perpendicular to the direction of belt travel in the process direction (angle $\Theta$ as illustrated) changes. It is more important that the angles $\Theta$ and $\Theta'$ be great enough so that the effect of belt tracking on the relative angles between a roll pair and the belt always remain a positive and a negative. If the angle $\Theta$ is not great enough a change in relative angle caused by lateral belt travel could cause both angles to be positive (or negative) with respect to the belt thereby exacerbating the resultant side forces in one direction or the other which would increase belt mistracking. Such forces would then be like those experienced in the normal idler roll design utilizing parallel rolls.

The net effect on the overall system is that there is a great reduction in the resultant side force on the belt while maintaining drag indenting forces at a relatively low level. This type of system also greatly reduces the amount of slippage between the belt and back supports (i.e. when compared with skid plates) which will in turn reduce belt wear.

In recapitulation, there is provided a system to support a moving photoreceptor belt in an electrophotographic printing machine while minimizing resultant side forces and drag and tensioning forces on the photoreceptor. Pairs of idler rolls are located in contact with the inner surface of the belt in an arrangement in which the axes of rotation of the idlers are skewed in substantially equal but opposite angles from a direction perpendicular to the direction of belt motion. As the resultant lateral forces act in a direction nearly parallel to the axes of rotation of the idlers, the opposing skew essentially cancels the side force of each pair of idlers which promotes good belt tracking. As the idlers are freely rotating, drag and tensioning forces on the belt are also minimized.

It is, therefore, apparent that there has been provided in accordance with the present invention, a belt support system that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An electrophotographic printing machine of the type having an endless photoreceptor belt arranged to move along a path in a predetermined direction, including:
    a first rotatable member contacting the belt; and
    a second rotatable member contacting the belt, said first rotatable member having a first axis of rotation and said second rotatable member having a second axis of rotation, with the first axis of rotation and the second axis of rotation in a common plane spaced from a portion of the photoreceptor belt disposed between said first rotatable member and said second rotatable member, said first rotatable member and said second rotatable member being oriented relative to one another to cancel forces applied on the belt in a direction substantially normal to the predetermined direction.

2. A printing machine as claimed in claim 1, wherein:
    said first rotatable member includes an axis of rotation extending in a first direction transverse to the predetermined direction; and
    said second rotatable member includes an axis of rotation extending in a second direction transverse to the predetermined direction.

3. A printing machine as claimed in claim 2, wherein the axis of rotation of said first rotatable member forms a first acute angle with the predetermined direction, and the axis of rotation of said second rotatable member forms a second acute angle with the predetermined direction, wherein the first acute angle and the second acute angle are substantially equal in magnitude and opposite in direction.

4. A printing machine as claimed in claim 3, in which said first rotatable support includes:
    a first idler roll; and
    a first axle supporting said first idler roll rotatably with said first roll being in contact with said web, said first axle being oriented in the first direction transverse to the predetermined direction.

5. A printing machine as claimed in claim 4, in which said second rotatable support includes:
    a second idler roll; and
    a second axle supporting said second idler roll rotatably with said second roll being in contact with said web, said second axle being oriented in the second direction transverse to the predetermined direction.

* * * * *